(12) United States Patent
Maruccia et al.

(10) Patent No.: US 8,352,628 B2
(45) Date of Patent: *Jan. 8, 2013

(54) METHOD FOR TRANSFERRING DATA FROM A SOURCE TARGET TO A DESTINATION TARGET, AND CORRESPONDING NETWORK INTERFACE

(75) Inventors: Giuseppe Maruccia, Grenoble (FR); Riccardo Locatelli, Grenoble (FR); Lorenzo Pieralisi, Seyssins (FR); Marcello Coppola, Moirand (FR)

(73) Assignee: STMicroelectronics SA, Montrouge (FR)

( * ) Notice: Subject to any disclaimer, the term of this patent is extended or adjusted under 35 U.S.C. 154(b) by 677 days.

This patent is subject to a terminal disclaimer.

(21) Appl. No.: 12/143,196

(22) Filed: Jun. 20, 2008

(65) Prior Publication Data

US 2008/0320161 A1    Dec. 25, 2008

(30) Foreign Application Priority Data

Jun. 25, 2007   (EP) ..................................... 07301146

(51) Int. Cl.
*G06F 15/16* (2006.01)
*G06F 15/167* (2006.01)

(52) U.S. Cl. ........ 709/232; 709/206; 709/211; 709/212; 709/217; 709/228

(58) Field of Classification Search .......... 709/204–209, 709/211–212, 217, 227–228, 230–232
See application file for complete search history.

(56) References Cited

U.S. PATENT DOCUMENTS

| | | | |
|---|---|---|---|
| 6,081,851 A | 6/2000 | Futral et al. | 710/23 |
| 6,341,318 B1 * | 1/2002 | Dakhil | 710/23 |
| 2004/0100958 A1 * | 5/2004 | Peng | 370/392 |
| 2005/0238035 A1 | 10/2005 | Riley | 370/401 |
| 2006/0075057 A1 | 4/2006 | Gildea et al. | 709/212 |
| 2007/0041383 A1 * | 2/2007 | Banikazemi et al. | 370/395.3 |
| 2007/0147379 A1 * | 6/2007 | Lee et al. | 370/392 |

OTHER PUBLICATIONS

Rădulescu, Andrei; Dielissen, John; Goossens, Kees; Rijpkema, Edwin; and Wielage, Paul. "An Efficient On-Chip Network Interface Offering Guaranteed Services, Shared-Memory Abstraction, and Flexible Network Configuration". Design, Automation and Test in Europe Conference and Exhibition, 2004, Proceedings. Print ISBN: 0-7695-2085-5. Mar. 8, 2004.*

* cited by examiner

*Primary Examiner* — Ashok Patel
*Assistant Examiner* — Kevin Bechtel
(74) *Attorney, Agent, or Firm* — Allen, Dyer, Doppelt, Milbrath & Gilchrist, P.A.

(57) ABSTRACT

A method is for transferring data from a source target to a destination target in a network. The method includes sending at least one request packet for the destination target, with the request packet containing information relating to a first address where data are located and a second address where data are to be stored. Moreover, at least one transaction request is sent to the source target, with the read request being elaborated from information contained in the request packet. The source target transfers the data located at the first address to the second address.

35 Claims, 4 Drawing Sheets

| HEADER FIELD | ATTRIBUTE | DESCRIPTION |
|---|---|---|
| <1:0> | dir | |
| <9:2> | dest_id | OBTAINED BY THE DESTINATION ADDRESS β |
| <10> | lck | |
| <11> | msg | |
| <15:12> | QoS | |
| <16> | reserved | |
| <17> | config | |
| <21:18> | pri | |
| <22> | mw | 0 => STORE |
| <23> | adv | 1 => DMA reg |
| <26:24> | opsize | 011 => 8Bytes |
| <27> | nda | |
| <35:28> | src | DMA INITIATOR SOURCE |
| <39:36> | tid | DMA TRANSACTION IDENTIFIER |
| <71:40> | add | DESTINATION ADDRESS β FOR THE DMA TRANSFER |
| <15:0> | attr | |
| <71:16> | reserved | |

FIG. 3

| PAYLOAD FIELD | DESCRIPTION |
|---|---|
| <31:0> | REMOTE ADDRESS |
| <35:32> | NUMBER OF TRANSFERS |
| <38:36> | TRANSFER SIZE= Stbus OPCODE SIZE |
| <63:39> | NOT USED |

FIG. 4

METHOD FOR TRANSFERRING DATA FROM A SOURCE TARGET TO A DESTINATION TARGET, AND CORRESPONDING NETWORK INTERFACE

FIELD OF THE INVENTION

The invention relates, in general, to on-chip communication architectures and is, in particular, directed to the transmission of data from a source target to a destination target belonging to separate interconnection systems of such on-chip communication architectures.

BACKGROUND OF THE INVENTION

More particularly, the invention is directed to the communication of data between an on-chip bus and a so-called network-on-chip system. As a matter of fact, researchers have recently proposed the network-on-chip concept (NoC) to overcome the limitations relating to the huge efforts necessary to adequately design on-chip communication systems.

NoC aims at providing scalable and flexible communication architectures with suitable performance. NoCs are based on a packet switched communication concept and mainly include three NoCs modules, namely a router, a network interface (NI), and a link.

Concerning the data format, data packets within a NoC generally include a header and a payload. The header is responsible for carrying all the information required for performing communication, whereas the payload contains the actual information to be transmitted.

Conversely, data packets transmitted over an on-chip bus are based on specific transaction protocols. For example, the so-called "ST bus," developed by the Applicant, is based on a "ST bus protocol type 3" using a separate request channel and a response channel to provide communication between an initiator module and a target module.

Conversion of data may be carried out to provide communication between such separate interconnection systems. In addition, when clocks differ, synchronization is to be carried out to allow communication between such interconnection systems.

Usually, network interfaces are, in particular, provided to connect communicating blocks of an integrated circuit to the network and between the on-chip bus and the router of the NoC in order to convert data from one packet format to another.

In one approach according to the prior art, data communication between two interconnection systems is based on the use of a processing unit associated with a direct memory access (DMA), the processing unit being used as a master unit to send a load request to a source target to retrieve data from a first address. The processing unit also sends a store request to a destination target to store the retrieved data at a destination address, previously stored in the DMA engine.

However, such a communication system is limited due to the fact that it is, in general, slow and thus very time consuming. In addition, the processing unit is unavailable during the whole data transfer process. As a matter of fact, a standard DMA engine uses more than one (usually 8) channels. Each channel used for a different DMA transfer and a particular "channel x" is unavailable during a certain DMA transfer related to itself.

SUMMARY OF THE INVENTION

In view of the foregoing, according to one aspect, there is a method for transferring data from a source target to a destination target in a network.

The method comprises sending at least one request packet for the destination target, the request packet containing information relating to a first address where data are located and a second address where data are to be stored, sending at least one transaction request from the destination target to the source target, the read request being elaborated from information contained in the request packet, and causing the source target to transfer the data located at the first address to the second address.

In other words, according to the prior art, transfer of data is done through a DMA engine in order to move a certain amount of data from one memory starting from a source address to another memory starting from a destination address. The DMA engine starts transferring data to the destination target step by step.

Conversely, according to the present approach for transmitting data between the source and destination targets, the network interface to which the destination target is connected sends read requests to the network interface where the source target is connected for reading information from the source target.

When the network interface of the destination target receives back the requested information as a reply to the read request, it stores them in the target connected to itself, starting from the destination address. Accordingly, this aspect leads to gain both in terms of performance and processing capabilities for the networks, as the network interfaces are mainly responsible for performing data communication between the source target and the destination target.

According to another feature, the request packet contains, in addition, information relating to the size of the transfer. The request packet may also contain information relating to the number of data transfers.

One field having information for identifying the method for transferring data may also be included in the request packet. In such a case, the information may be coded in a header field of the request. Concerning the second address, this address may be coded in the header field of the request packet. Conversely, the first address may be coded in the payload of the request packet. In addition, the information relating to the size of the transfer or the information relating to the number of transfers may be coded in the payload of the request packet.

For example, the method may comprise checking the information for identifying the method for transferring data, retrieving from the header field the second address where data is to be stored, storing in memory means or circuitry the second address, and retrieving the first address where data are located, the number of transfers, and the transfer size, from the payload.

The method may further comprise storing in memory means or circuitry of the network interface connected to the destination target request packets, each specifying at least one address where a set of data is to be retrieved.

For example, the transaction requests are incrementally sent from the network interface connected to the destination target to a network interface connected to the source target. In addition, the location of the source target may be retrieved from a look-up table used for decoding the first address.

According to another aspect, there is a network interface for connecting and providing communication in a network between a source target and a destination target, comprising means or circuitry for retrieving, in at least a request packet, information relating to a first address where data to be received is located, and to a second address where data is to be stored and means or circuitry for causing the source target to transfer the data located at the first address to the second address.

This network interface may further comprise decoding means or circuitry for decoding a header of the request packet for retrieving the second address and for decoding a payload of the request for retrieving the first address According to another feature of the network interface, there are means or circuitry for decoding the payload of the request packet to retrieve a size of data transfer and a number of data transfers.

For example, the network interface further comprises first memory means or circuitry for storing transaction requests elaborated from information data retrieved from the request packet and means or circuitry for incrementally sending the transaction requests to the source target. The network interface may further comprise second memory means or circuitry for storing data transmitted by the request.

In one embodiment, the network interface comprises a first part for performing a data protocol conversion and a second part for performing protocol independent data processing. For example, the first and second parts each comprise an input control block and an output control block for extracting request data in a first format from incoming request packets and storing the extracted data in the second memory means or circuitry, and for reading contents from the second memory means or circuitry and for generating the read data signals in a second format. The network interface may further comprise means or circuitry for synchronizing the input and output control blocks.

BRIEF DESCRIPTION OF THE DRAWINGS

Other advantages and features of the invention will appear on examining the detailed description of embodiments, these being in no way limiting, and of the appended drawings in which

FIG. 3 shows the structure of a request packet header, in accordance with the present invention;

FIG. 4 illustrates the structure of a request packet payload, in accordance with the present invention;

DETAILED DESCRIPTION OF THE PREFERRED EMBODIMENTS

Figure 1:
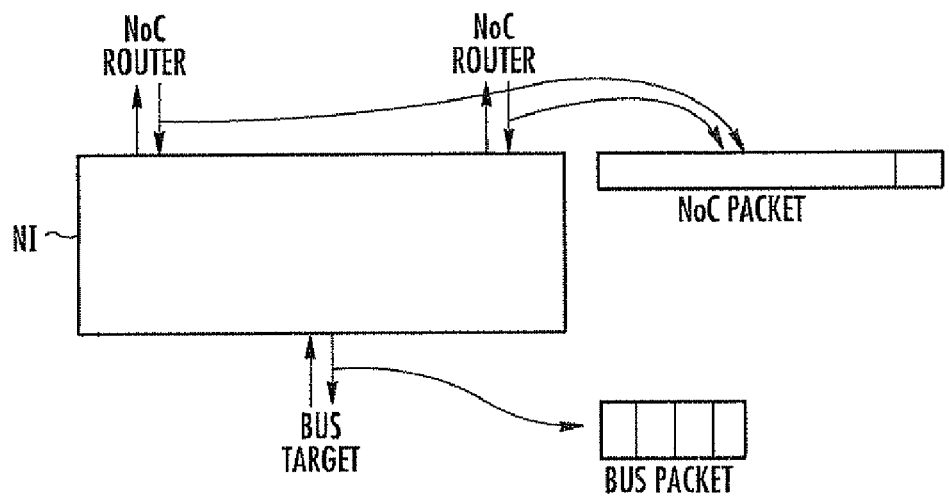
FIG. 1 illustrates schematically the architecture of a network interface implemented for providing communication between a network-on-chip and an on-chip bus, in accordance with the present invention.

In the embodiment illustrated in FIG. 1, the network interface NI is intended to provide communication between two separate interconnected systems namely, in the illustrated example, a network-on-chip and an on-chip bus.

More particularly, this network interface is used to transfer data from a source target connected to a network on-chip to a destination target connected to an on-chip bus. However, it should be noted that the network interface can be used to allow communication between other types of interconnection systems and, in particular, it can be used with other on-chip protocols, namely the so-called Advanced Microcontroller Bus Architecture (AMBA), Advanced eXtensible Interface (AXI), and Open Core Protocol (OCP) protocols.

As it is known, data transmitted through the network on-chip and through the on-chip bus have differing formats. As a matter of fact, network on-chip is a communication architecture for systems on-chip, usually based on the concept of packet switching rather than circuit switching.

In an on-chip bus, data is transmitted in the form of packets including a set of cells that are not interruptible. In a NoC context, the packets are split into basic units called flits (Flow Control Units), and comprise a payload containing actual information to be transmitted and a header responsible for carrying all the information required for performing communication.

In view of the foregoing, the network interface NI is intended to provide communication between and transmit response packets to a source target, connected to the network through a router, and a destination target, connected to the on-chip bus.

The network interface is thus intended to realize a conversion of request packets, according to the protocol supported by the on-chip bus, into request packets having the structure corresponding to the network on-chip concept. In addition, the network interface is intended to convert response packets issued from the NoC into packets corresponding to the on-chip bus.

In addition, the network interface is intended to allow communication between a destination target and a source target, taking into account possible clock differences. Although one network interface has been illustrated, the communication system is based on a distributed Direct Memory Access concept (distributed DMA) used in systems having a unique master and several targets, in which the master acts as a DMA initiator, and is responsible for programming transfers of data between the targets connected.

As a matter of fact, the DMA initiator, namely a DMA engine, instructs the network interface where the destination target is connected, to send to the network interface where the source target is connected a read request for a set of bytes starting from an address a in the source target. When the destination target network interface receives back these bytes as a reply to the read request, it stores them in the target connected to itself, starting from the address β. Once finished, the destination target network interface propagates to the DMA engine a reply in order to signal the end of this DMA transfer.

In other words, the DMA initiator engine sends particular request instructions in the form of "$ load α store β" to the network interface where the destination target is connected, meaning that $ bytes starting from the address α at the source target should be transferred to the destination target from address β. This shows that all communicating blocks can be either a destination target or a source target of a DMA transfer, these targets being connected to the network on-chip with the distributed DMA network interface of FIG. 1, while the DMA engine initiator is connected to the network with an initiator network interface.

Figure 2:
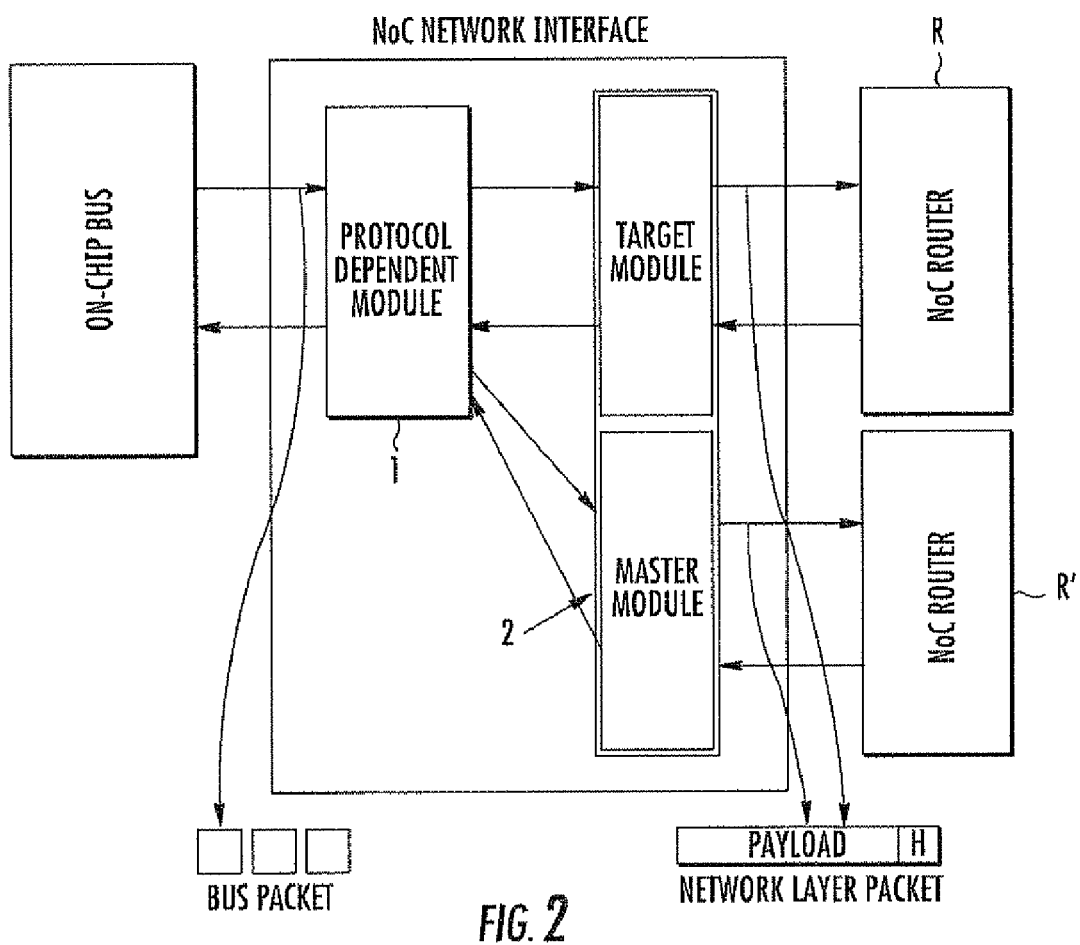
FIG. 2 shows a generic architecture of the network interface of FIG. 1.

As illustrated in FIG. 2, the distributed DMA network interface comprises two blocks, namely a first protocol dependent module 1, and a second protocol independent module 2, having a target module and a master module.

The first module is responsible for performing the transformation required between the on-chip bus protocol and the NoC packets for normal transactions, and, to cope with the management of the master and the target module 2, in order to cope with the distributed DMA transfers. The second module 2 is responsible for what is protocol independent, for example internal storage and communication with the routers.

As illustrated, the first module 1 communicates with the on-chip bus using bus packets corresponding to the format used in the on-chip bus, whereas the second module communicates with routers R and R' using network layer packets having, as previously indicated, a header H and a Payload.

To cope with the above mentioned special DMA transfer in which the DMA transfer functions are spread within the network interfaces, the initiator engine of the distributed DMA request provides the starting local address a where to store the transferred data, the starting remote address β where the data is located, and the size of the transfer. This information is coded, inside the NI initiator 15 in FIG. 6, within the request packet and is sent to the network interface where the destination target is connected.

For that purpose, the DMA request packet is tagged so that the network interface can detect the distributed DMA request. For example, as illustrated in FIG. 3, single bytes are used to transmit the requested information. However, it should be noted that the DMA request made by the so called "distributed DMA engine" is not tagged whereas the DMA request packet related to this DMA request and produced by the initiator NI (15 FIG. 6) is tagged.

In particular, as illustrated, the bit <23>in the request packet header is set to one by the initiator network interface connected to the distributed DMA engine. The DMA engine initiator uses a specific operation code (opcode) in order to code the distributed DMA request. For example, in a specific embodiment, in the above-mentioned STBus type 3 protocol a possible opcode to be used is 0 011 0110, where opcode <7>=0 and where opcode<6:4>=0 11 to indicate the size of the transaction, namely eight bytes, in this case, and opcode <3:0>=0110, to indicate, in comparison with a standard store opcode 0010, that the byte opcode <2>has been set to one and is used to signal advanced transaction.

Moreover, header<35:28>is used to indicate the DMA initiator source and header<39:36> is used to identify the DMA transaction. Additionally, header<71:40>is used to code the destination address β for the DMA transfer.

The illustrated structure shows that the DMA initiator gives the destination address β of the DMA transfer using the header field of the request packet. The remote address where the data to be transferred is located and the size in bytes of the transfer are coded within the payload field of the request packets.

As indicated in FIG. 4, the payload field <31:0> indicates the remote address where the data is to be retrieved, the payload field <35:32> indicates the number of transfers to be carried out, and the payload field <38:36> indicates the transfer size.

In other words, the DMA initiator, using information coded within the request packet, instructs the distributed DMA network interface connected to the destination target about the way to gather the data to be transferred from the source target. In other words, the distributed DMA engine produces a request of memory transfer, that once filtered by the initiator NI (15 FIG. 6) has as result the request packet related to the wanted distributed DMA.

As indicated further, the destination network interface stores in memory means or circuitry a set of load requests, the number of which corresponds to the number of transfers. Each request is intended to retrieve a set of data from the source target, the number of bytes corresponding to the transfer size coded within the payload.

In addition, the DMA engine initiator may instruct the destination network interface if the load requests may be linked inside a chunk, namely a set of packets linked together by a lock signal. It should be noted that the number of transfers coded within the payload field is, for example, coded in four bits such that it is possible to have from one to sixteen transfers relative to a single "distributed DMA" transaction. The transfer size information is instead coded, for example, using three bits such that the variable transfer size lies between 2 and 64 bytes (power of 2 of the value of these 3 bits). Accordingly, the biggest DMA transfer available is 16×64, namely 1024 bytes.

Figure 5:
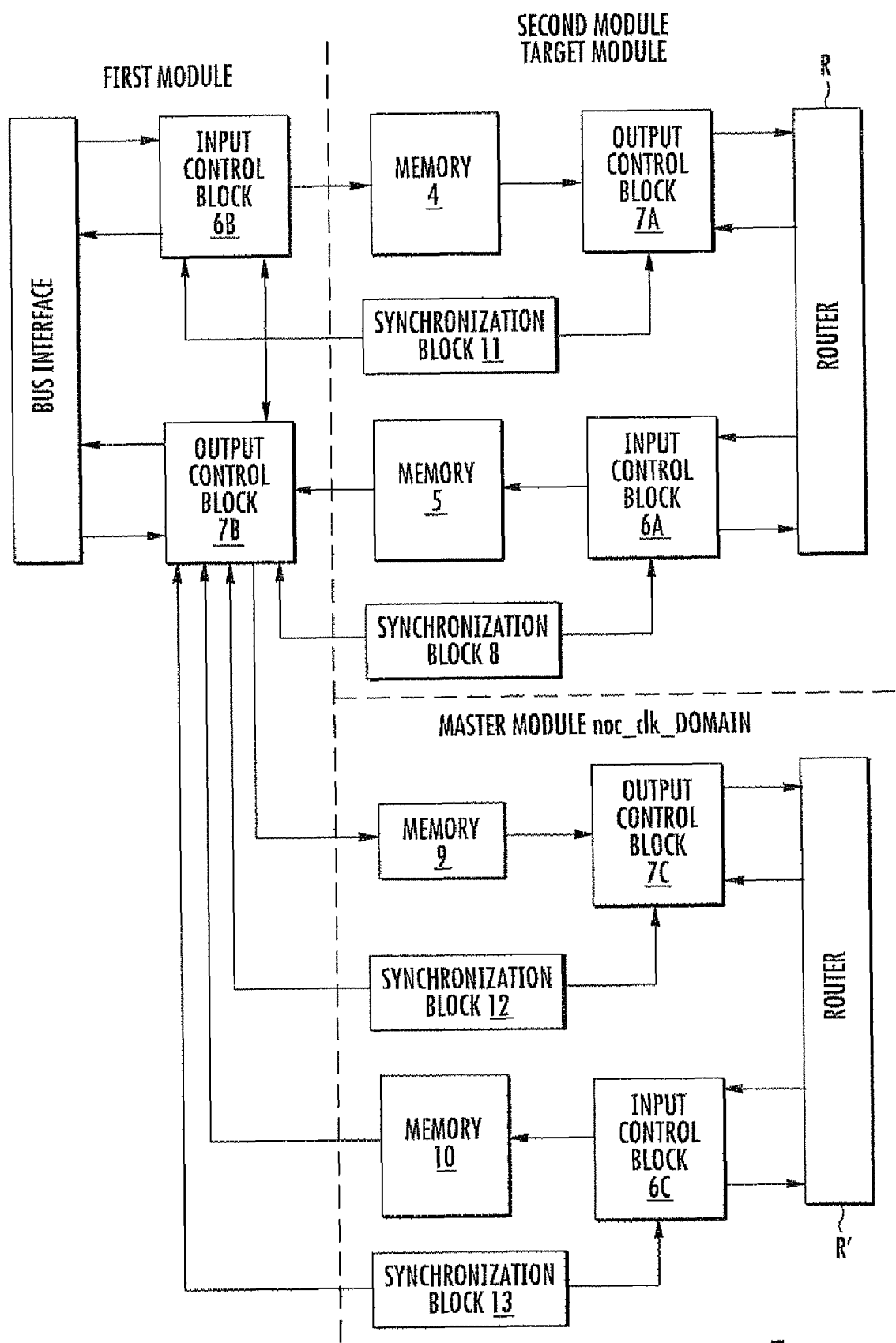
FIG. 5 illustrates a detailed description of the network interface architecture, in accordance with the present invention.

Reference is now made to FIG. 5 illustrating an example of a detailed architecture of a DMA network interface. As illustrated, the network interface comprises a first part, namely the first dependent protocol module 1, and a second part, namely the above mentioned independent protocol module 2 having a target module and a master module.

When data is transmitted from the on-chip bus through the bus interface to the NoC, the first module encodes traffic from the bus and stores it inside a First-In First-Out (FIFO) memory 4. In other words, the first module realizes a conversion of the received traffic to generate a header and a payload according to the NoC requirements and store them in the FIFO 4. The target module reads contents from the memory 4 and sends them by flits to the NoC, through the router R.

When data is transferred from the NoC to the bus, the second module 2 collects flits from the NoC side, realizes a packet reconstruction, and puts the collected packets in a corresponding FIFO memory 5. The first module 1 thus reads the FIFO and decodes its content in order to extract the correct bus traffic.

It should be noted that the FIFO memories 4 and 5 are provided within the network interface in order to decouple the first module from the second module, meaning that several packets can be stored inside FIFOs by the first module before being sent. In addition, this choice leads to gain both in terms of performance and in terms of memory usage.

The description of the overall architecture of an example of a network interface will now be made in reference to an embodiment in which a transmission request is transmitted from a network interface connected to the network on-chip, to a source target network interface connected to the bus onchip. However, the description also applies in the case in which the request is issued from a destination target connected to the bus in order to retrieve and store data stored in a source target connected to the NoC.

As illustrated, the first module, the target module, and the master module each comprise an input control block 6a, 6b and 6c and an output control block 7a, 7b and 7c. When the request packet is received by the input control block 6a of the target module, the packets, split into flits, are collected by the input control block 6a, are reconstructed, and are saved inside the FIFO memory 5 in the proper order.

The output control block 7b of the first module is thus responsible for taking the packet saved in the FIFO memory 5 and to produce the request for the source target according to the on-chip bus protocol.

It should be noted that, as the output control block 7b and the input control block 6a may operate at different frequencies, a synchronization block 8 is provided between the two blocks 6a and 7b in order to avoid metastability problems in exchanging signals used by the two blocks to correctly evaluate the full or empty status of the memory 5.

In addition, as already indicated, the DMA request packet can be identified by receiving distributed DMA Nis, by checking a DMA tag (FIG. 3) in the transport header of the request packet. When the output control block 7b has checked that the header field <23> is set to one, it stores in an internal buffer some of the information coming with the request packet and stored in the FIFO memory 5, namely a DMA initiator source identifier and the local address β where the data once retrieved may be stored, and the transaction identifier given by the DMA engine initiator in order to make a distinction among multiple outstanding DMA requests.

In addition, from the first four bytes of the payload in the DMA request packet, the output control block 7b retrieves the remote address a of the source target containing the data which may be transferred locally to the destination target. Furthermore, from the fifth byte inside the payload, the output control block retrieves the number of transfers and the transfer size information.

The output control block 7b then stores, in a FIFO memory 9 of the master module, N request transactions of the read type, for example N read transactions in the form "read TS", where N and TS respectively correspond to the number of transfers and to the transfer size. These read TS requests are incrementally addressed to the remote source target, starting from the remote address a. Accordingly, each read TS request has a different incremental address α+ITS in which I varies from zero to N−1.

It should be noted that these read transactions are mapped in the NoC packets in the same way as if they were produced by an initiator network interface connected to an external master block such as a central processing unit (CPU) or similar. It should also be noted that the network interface, and in particular the network interface of the destination target, comprises a look-up table for decoding the remote address α.

The read transaction TS requests extracted from the FIFO memory 9 ate then converted into packets split into flits by the output control block 7c and are then forwarded to the source target.

N read transaction requests are emitted. An internal counter C provided, for example, within the output control block 7b, is used to check how many read transaction requests are completed. The value of the counter initially set to N is decremented when a read transaction request is completed, each time a result of a read transaction is gathered from FIFO 10 and transformed to a write request towards the destination.

Each write request has thus a different incremental address in the form β+(N−C)×TS. In other words, these are the store requests (namely N write transactions TS) emitted towards the destination target once the Read TS results have been gathered.

A similar counter RC initially set to 1 is also provided, for example in the input control block 6b, to check how many response packets are received in reply to the write requests. This counter RC is also decremented when such a response packed is received.

When the value of the counter C is zero, this indicates that the read TS transactions have been propagated to the source target, read TS results are arrived in FIFO 10 and are used to produce write requests.

Concerning the counter RC of the input control block 6b, when the value of this counter is not zero, if the input control block receives a response from the target, it may determine that the reply is the response to the transaction. If the counter value is bigger than one, meaning that transaction requests are still pending, in this case, the RC counter is decremented and this response is skipped. If, instead, the RC value is one, the last reply of the last write transaction request related to a distributed DMA has been received. In this case, the input control block 6b stores the response coming from the target in order to produce a response for the overall memory transfer to the distributed DMA engine.

As illustrated in FIG. 5, when received, the response packets split into flits are reconstructed by the input control block 6c and stored in a FIFO memory 10 associated with the control block 6c. This phrase is relative to the first N read TS transactions responses. The stored packets are then retrieved by the output control block 7b of the first module for generating signals according to the format supported by the on-chip bus and delivered to the destination target.

A similar approach is used to transmit data from the on-chip bus to the NoC. In this case, the received packets are processed by the input control block 6b for header and payload generation and are then stored in the FIFO memory 4. The data is then retrieved by the output control block 7a for packet generation according to the format supported by the NoC and are then forwarded to the NoC.

At last, it should be noted that other synchronization blocks, such as 11, 12 and 13 are used to synchronize the input control block 6c and the output control block 7b and 7c, as well as the input and output control blocks 6b and 7a.

Figure 6:
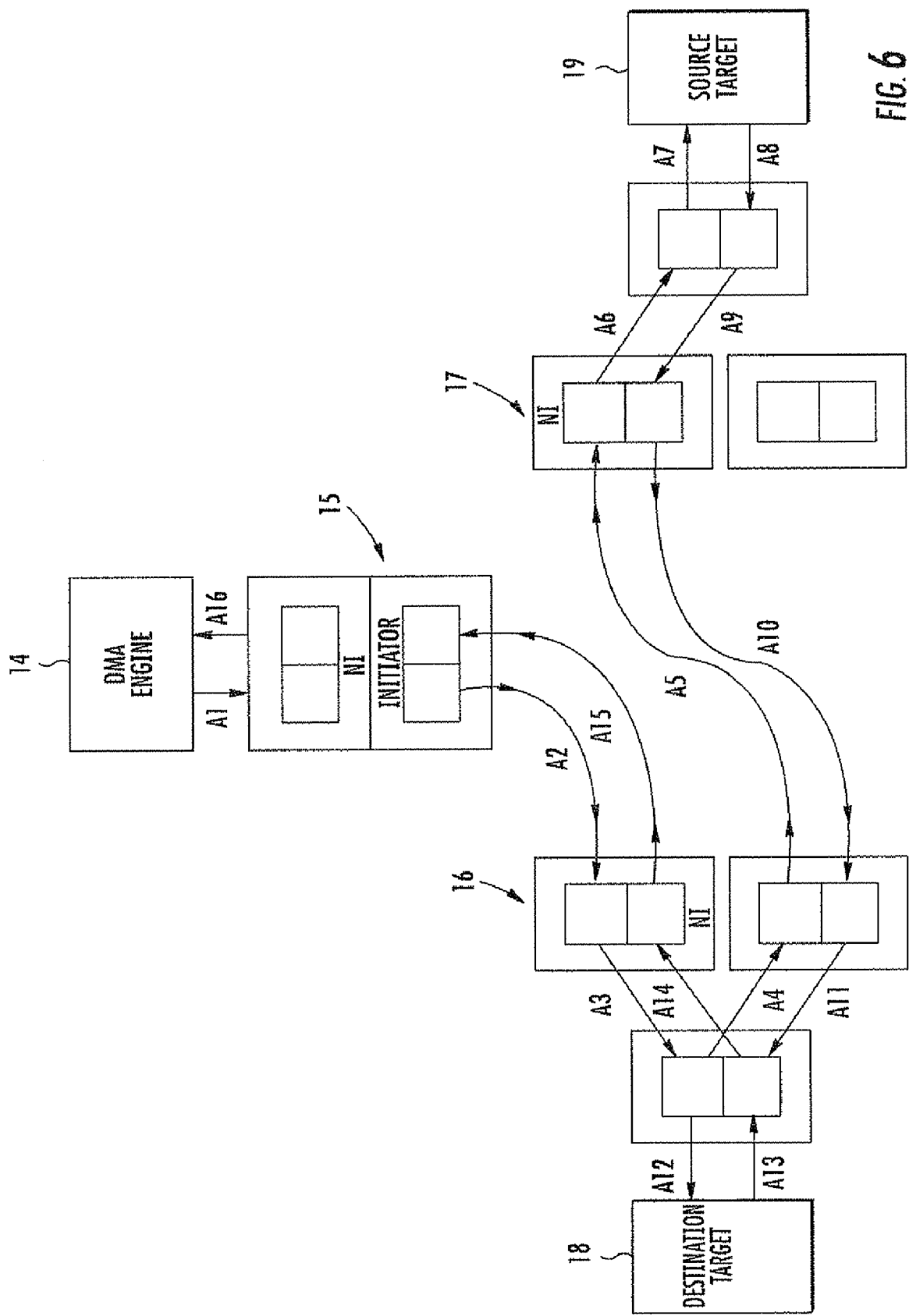
FIG. 6 illustrates the transfer of transaction requests and of responses from a distributed DMA engine to the destination target and then to the source target, in accordance with the present invention.

Referring now to FIG. 6, an example of the path of the request DMA packets from a DMA engine 14 to a proper DMA network interface is given.

As previously indicated, the DMA request issued by the distributed DMA engine (arrow A1) is transmitted to the DMA engine network 15 interface that produces a DMA request packet that is then delivered to the proper network interface of the destination target (arrow A2).

As also previously indicated, incoming data transmitted by the request is retrieved and stored within the FIFO memory of the network interface and then decoded by the output control block of the corresponding first module.

The N request transaction requests of the type "read TS" are then stored in the FIFO memory 9 of the corresponding master module (arrows A3 and A4) and then transmitted to the source target NI 17 (arrow A5) and to the target 19 (arrows A6 and A7). Data is then retrieved by the network interface 17 connected to the network and, in particular, by the input control block 6b, to be transmitted, through the output control block 7a of the target module 2, to the input control block 6c of the master module of the network interface connected to the destination target (arrows A8, A9 and A10). After packet reconstruction and storage of the packets in the FIFO memory 10 (FIG. 5), the retrieved data is transmitted to the destination target 18 using N write TS transactions (arrows A11 and A12)

Thereafter, N−1 responses to the first N−1 write TS transactions are transmitted to the target module (arrows A13 and A14). The last response, namely the Nth one, is the one that is used as a response for the DMA request and reaches the DMA initiator 14 (arrows A15 and A16).

That which is claimed:

1. A method for transferring data from a source target to a destination target in a network-on-a-chip (NoC), the method comprising:
   sending at least one request packet to the destination target, the at least one request packet comprising an indication of a first address where the data is located, a second address where the data is to be stored, a size of the data to be transferred, and a number of data transfers;
   sending at least one transaction request packet from the destination target to the source target, the at least one transaction request packet being based upon information contained in the at least one request packet; and causing the source target to transfer the data located at the first address to the second address in packets having sizes determined based upon the number of data transfers and the size of the data to be transferred.

2. The method according to claim 1, wherein the at least one request packet further comprises a field having information to identify a method for transferring the data.

3. The method according to claim 2, wherein the field comprises a header field.

4. The method according to claim 3, wherein the header field further comprises information relating to the second address.

5. The method according to claim 4, wherein the at least one request packet further comprises a payload including information relating to the first address.

6. The method according to claim 5, wherein the payload further comprises information relating to the size of the data to be transferred.

7. The method according to claim 6, wherein the payload further comprises information relating to the number of data transfers.

8. The method according to claim 7, further comprising:
checking the information to identify the method for transferring the data;
retrieving, from the header field, the second address;
storing the second address in a memory; and
retrieving, from the payload, the first address, the number of data transfers and the size of the data to be transferred.

9. The method according to claim 8, further comprising storing, in the memory, request packets each specifying at least one address where a set of data is to be retrieved.

10. The method according to claim 9, further comprising incrementally sending the at least one transaction request packet from a first network interface connected to the destination target to a second network interface connected to the source target.

11. The method according to claim 1, further comprising retrieving a location of the source target from a look-up table for decoding the first address.

12. The method according to claim 1, wherein the sending at least one request packet, sending at least one transaction request packet, and causing the source target to transfer the data are all performed in the network-on-a-chip (NoC).

13. A method for transferring data from a source target to a destination target in a network-on-a-chip, the method comprising:
sending at least one request packet to the destination target, the at least one request packet comprising an indication of a number of data transfers and a size of the data to be transferred;
sending at least one transaction request packet from the destination target to the source target, the at least one transaction request packet being based upon information contained in the at least one request packet; and
causing the source target to transfer the data to the destination target in packets having sizes determined based upon the number of data transfers and the size of the data to be transferred.

14. The method according to claim 13, wherein the at least one request packet further comprises a field having information to identify a method for transferring the data.

15. The method according to claim 14, wherein the field comprises a header field.

16. A network interface device to provide communication between a source target and a destination target in a network-on-a-chip (NoC), the device comprising:
circuitry for retrieving at least one request packet comprising an indication of a first address where data is located, a second address where the data is to be stored, a size of the data to be transferred, and a number of data transfers;
circuitry for sending at least one transaction request packet from the destination target to the source target, the at least one transaction request packet being based upon information contained in the at least one request packet; and
circuitry for causing the source target to transfer the data located at the first address to the second address in packets having a size based upon the number of data transfers and the size of the data to be transferred.

17. The device according to claim 16, wherein the at least one request packet further comprises a header field having information to identify a method for transferring the data and information relating to the second address.

18. The device according to claim 17, wherein the at least one request packet further comprises a payload including information relating to the first address, the size of the data to be transferred, and number of data transfers.

19. The device according to claim 18, wherein the circuitry for retrieving retrieves from the header the second address and retrieves from the payload the first address.

20. The device according to claim 18, wherein the circuitry for retrieving retrieves from the payload the size of a data transfer and the number of data transfers.

21. The device according to claim 18, further comprising a memory to store transaction request packets; and wherein the circuitry for sending incrementally sends the transaction request packets to the source target.

22. The device according to claim 21, further comprising a second memory to store transmitted data.

23. The device according to claim 16, further comprising a first part to perform data protocol conversion and a second part to perform protocol independent data processing.

24. The device according to claim 23, wherein the first and second part each comprise an input control block to extract request data in a first format from incoming request packets and store the extracted request data in the second memory, and an output control block to read contents from the second memory and generate data signals, based upon the contents read from the second memory, in a second format.

25. The device according to claim 24, further comprising circuitry to synchronize the input and output control blocks.

26. An integrated circuit comprising:
a source target;
a destination target;
circuitry for sending at least one request packet to the destination target, the at least one request packet comprising an indication of a first address where data is located, a second address where the data is to be stored, a size of the data to be transferred, and a number of data transfers;
circuitry for sending at least one transaction request packet from the destination target to the source target, the at least one transaction request packet being based upon information contained in the at least one request packet; and
circuitry for transferring the data located at the first address to the second address in packets having sizes determined based upon the number of data transfers and the size of the data to be transferred.

27. The integrated circuit according to claim 26, wherein the at least one request packet further comprises a header field having information to identify a method for transferring the data and information relating to the second address.

28. The integrated circuit according to claim 27, wherein the at least one request packet further comprises a payload including information relating to the first address, the size of the data to be transferred, and a number of data transfers.

29. The integrated circuit according to claim 28, wherein the circuitry for retrieving retrieves from the header the second address and retrieves from the payload the first address.

30. The integrated circuit according to claim 28, wherein the circuitry for retrieving retrieves from the payload the size of a data transfer and the number of data transfers.

31. The integrated circuit according to claim 28, further comprising a memory to store transaction request packets; and wherein the circuitry for sending incrementally sends the transaction request packets.

32. The integrated circuit according to claim 31, further comprising a second memory to store transmitted data.

33. The integrated circuit according to claim 26, further comprising a first part to perform data protocol conversion and-a second part to perform protocol independent data processing.

34. The integrated circuit according to claim 33, wherein the first and second part each comprise an input control block to extract request data in a first format from incoming request packets and store the extracted request data in the second memory, and an output control block to read contents from the second memory and generate data signals, based upon the contents read from the second memory, in a second format.

35. The integrated circuit according to claim 34, further comprising circuitry to synchronize the input and output control blocks.

* * * * *